E. WANAMAKER.
FLEXIBLE PIPE COUPLING.
APPLICATION FILED JAN. 20, 1916.

1,309,830.

Patented July 15, 1919.

Witnesses:

Inventor:
Ernest Wanamaker,
by Frank D. Thomason
Atty.

UNITED STATES PATENT OFFICE.

ERNEST WANAMAKER, OF CHICAGO, ILLINOIS.

FLEXIBLE-PIPE COUPLING.

1,309,830.  Specification of Letters Patent.  Patented July 15, 1919.

Application filed January 20, 1916. Serial No. 73,109.

*To all whom it may concern:*

Be it known that I, ERNEST WANAMAKER, a citizen of the United States, residing at Chicago, in the county of Cook and State of Illinois, have invented new and useful Improvements in Flexible-Pipe Couplings, of which the following is a full, clear, and exact description.

My invention relates to coupling for pipes and conduits, and particularly to coupling for flexible pipes and hose used in connection for transmitting water or steam or air under pressure.

The object of my invention is to provide a coupling so constructed that a gasket or other packing of an elastic character will be compressed within the female member by the insertion of the male member in such position that the fluid or gas must pass through the same in order to escape and leak therefrom. It is also an object of my invention to so dispose of this gasket that while it is firmly retained in place it can be easily removed and replaced when worn out. This I accomplish by the means hereinafter fully described and as particularly pointed out in the claim.

The female member of this coupling comprises a tubular element, one end of which is less in diameter than the other and is exteriorly corrugated to form a stub A, which is adapted to be forced into and suitably secured in the bore of the end of the flexible pipe or hose B (shown in dotted lines in Fig. 1) in connection with which it is adapted to be used. The opposite end portion of this member is greater in diameter and constitutes the head C, and near the stub thereof its throat $a$ is increased in diameter to correspond with that of the forward end of the male member. This throat $a$ extends out for a short distance toward the mouth of the head and is then again stepped or increased in diameter to form an annular seat $b$ for the reception of a gasket or packing-ring D of compressible or elastic material. The side of this seat $b$ nearest the mouth of head C is defined by an inwardly projecting circumferential flange $c$, and the inner circumference of this flange is slightly greater than the circumference of throat $a$, the diameter of the mouth of said female member beyond this flange remains the same. The mouth of said female member is provided with two diametrically opposite inwardly projecting studs E, E.

The male member of my improved coupling is also provided with a stub $e$, the diameter and exterior construction of which is similar to stub A and is adapted to be secured in the adjacent end of its section of pipe or hose, and the bore of said member is the same diameter throughout its length and corresponds to that of the bore of stub A. Immediately next its stub its outer diameter is stepped or increased to form a boss F and about midway the length of this boss it is provided with a circumferential flange G the diameter of which corresponds to that of the mouth of the female member. This flange G is provided, at points diametrically opposite each other, with recesses $f$, $f$, the dimensions of which are such as to enable studs E, E, to pass therethrough when said flange is inserted in the mouth of the female member. When this is done the forward end of the male member will enter and fit snugly in throat $a$ of the female member; the forward portion of the boss will fit snugly within the circumference of flange $c$, and the shoulder terminating the advanced end of said boss will engage and compress the gasket or packing-ring, substantially as shown in Fig. 1 of the drawings.

Figure 1:
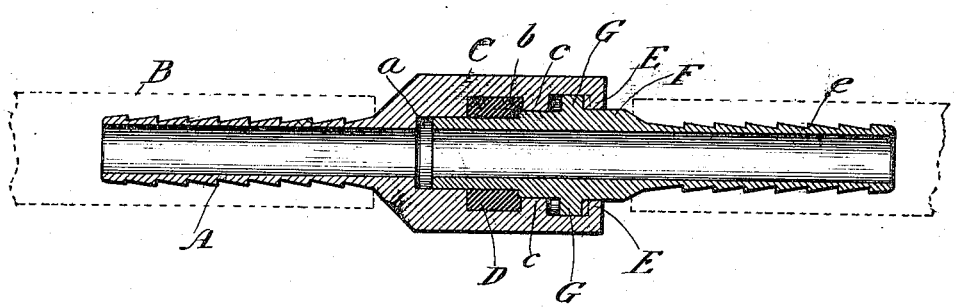
Figure 1 is a longitudinal central section through the parts of my improved coupling.
Figure 2:
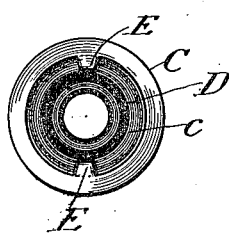
Fig. 2 is an end view of the female member.
Figure 3:
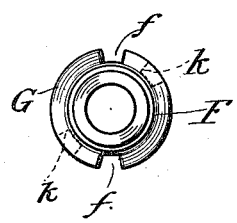
Fig. 3 is a similar view of the male member.
Figure 4:
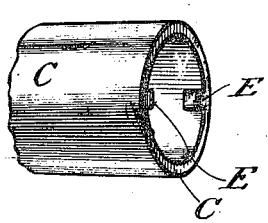
Figs. 4 and 5 are perspective views of the broken away end portions of said members, respectively.
Figure 5:
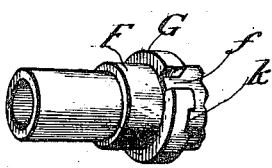

In order to retain the two parts of the coupling in the relative position just described, and as illustrated in Fig. 1 of the drawings, it is necessary to turn either said male or said female part on its axis to move studs E, E, back of flange G and thus prevent their withdrawal. In view of the fact that the handling of the flexible pipe or hose, to which my improved coupling may be applied, might accidentally turn either one or both parts of the coupling and bring studs E. E, into such position that they could accidentally work out through recesses $f$, $f$, and thus cause the parts of the coupling to separate, I have provided the side of said flange G, farthest from the forward end or nozzle of the male member, with recessed seats $k$, $k$, that are located diametrically opposite each other in such position that said studs will automatically seat themselves therein when said parts are properly united and prevent the independent turning or rotation of the same.

The only place where the liquid or gas can escape from my improved coupling is between the outer circumference of the advanced end or nozzle of the male member and the circumferential walls of the throat of the female member. When the two parts of the coupling are in engagement, as shown in Fig. 1 of the drawings, the mechanical compression of the gasket, and such compression as the liquid or gas seeking to escape therefrom will cause, will have a tendency to expand the gasket and absolutely prevent the escape of the medium, whether gas or liquid, passing through the pipe or hose in connection with which my improved coupling is employed.

What I claim as new is:—

A coupling of the kind specified comprising a tubular female member having a head the diameter of the bore of which is greater than that of the stub extending therefrom, and the diameter of the bore of said head being stepped to a still greater diameter for a portion of its length extending back from and including the mouth of the same; said greater bore being provided with an inwardly projecting annular flange whose inner circumference exceeds that of the rear end of the bore of the head, which latter, at the mouth thereof, is provided with spaced apart inwardly projecting studs the distance between the ends of which is greater than that of the diameter of the inner circumference of said annular flange, and a compressible packing ring the diameter of whose inner circumference corresponds to that of the rear end of the bore of the head and seated in and filling the annular space between the said annular flange and said rear end, in combination with a tubular male member the diameter of the advanced end portion of which corresponds to the diameter of the inner end of the bore of the head of the female member and which, at a point a distance back from its extremity exceeding the width of said packing ring, is stepped to a greater diameter not exceeding the inner circumference of the inwardly projecting annular flange of said female member, and, at a point back from said step a distance exceeding the width of said inwardly projecting flange is provided with an outwardly projecting annular flange having recesses in its circumference through which the studs of said female member are adapted to pass.

In witness whereof I have hereunto set my hand this 11th day of January, 1916.

ERNEST WANAMAKER.

Witnesses:
FRANK D. THOMASON,
F. R. MITCHELL.